US010678597B2

(12) United States Patent
Wang (10) Patent No.: US 10,678,597 B2
(45) Date of Patent: *Jun. 9, 2020

(54) EVENT-DRIVEN BLOCKCHAIN WORKFLOW PROCESSING (71) Applicant: Alibaba Group Holding Limited, George Town (KY)

(72) Inventor: Jiyuan Wang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,003

(22) Filed: Jan. 15, 2020

(65) Prior Publication Data
US 2020/0151017 A1 May 14, 2020

Related U.S. Application Data (63) Continuation of application No. 16/421,260, filed on May 23, 2019, now Pat. No. 10,540,209, which is a
(Continued)

(51) Int. Cl.
G06F 9/50 (2006.01)
H04L 29/08 (2006.01)
H04L 9/32 (2006.01)

(52) U.S. Cl.
CPC .......... G06F 9/5038 (2013.01); G06F 9/505 (2013.01); H04L 9/3236 (2013.01);
(Continued)

(58) Field of Classification Search
CPC ... G06F 16/27; G06F 9/5038; H04L 2209/38; H04L 2209/56; H04L 9/3236; H04L 41/0813
See application file for complete search history.

(56) References Cited

U.S. PATENT DOCUMENTS 10,225,208 B1 * 3/2019 Prahlad ............... H04L 41/0869
2007/0055558 A1    3/2007 Shanahan et al.
(Continued)

FOREIGN PATENT DOCUMENTS

CN    108573341 A    9/2018
CN    108804096 A    11/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Arvin Eskandarnia
(74) *Attorney, Agent, or Firm* — Fish & Richardson P.C.

(57) ABSTRACT

Implementations of the present specification include receiving, from a client in a blockchain network, a request to execute a workflow program, wherein the workflow program is stored in a blockchain maintained by the blockchain network; identifying an operation associated with the workflow program; assigning the identified operation to a subset of the plurality of nodes in the blockchain network, wherein each node is configured to execute the operation separately from the other nodes in the subset of nodes; identifying processing results for the executed operation associated with nodes in the subset of nodes, each processing result associated with a particular node from the subset and representing a result of the executed operation produced by the particular node; and determining a consensus result for the operation based on the identified processing results associated with a number of nodes greater than or equal to a consensus threshold matching the consensus result.

20 Claims, 6 Drawing Sheets

Related U.S. Application Data continuation of application No. PCT/CN2018/120795, filed on Dec. 13, 2018.

(52) U.S. Cl.
CPC .......... *H04L 9/3239* (2013.01); *H04L 9/3247* (2013.01); *H04L 67/10* (2013.01); *H04L 67/104* (2013.01); *H04L 2209/38* (2013.01)

(56) References Cited

U.S. PATENT DOCUMENTS

| | | | |
|---|---|---|---|
| 2014/0204750 A1* | 7/2014 | Salter .................... | H04L 41/28 370/235 |
| 2015/0332283 A1 | 11/2015 | Witchey | |
| 2016/0156595 A1 | 6/2016 | Wu et al. | |
| 2017/0048234 A1* | 2/2017 | Lohe .................... | G06Q 20/065 |
| 2017/0132619 A1* | 5/2017 | Miller ................ | G06Q 20/3829 |
| 2017/0236123 A1* | 8/2017 | Ali ........................ | G06Q 20/401 705/75 |
| 2017/0279774 A1* | 9/2017 | Booz ................... | G06F 16/24568 |
| 2017/0323392 A1* | 11/2017 | Kasper .................. | G06Q 40/12 |
| 2017/0337534 A1* | 11/2017 | Goeringer ............ | H04L 9/3239 |
| 2018/0039667 A1* | 2/2018 | Pierce ................. | G06Q 20/0658 |
| 2018/0103042 A1 | 4/2018 | Castagna et al. | |
| 2018/0115538 A1* | 4/2018 | Blake ................... | H04L 63/10 |
| 2018/0117447 A1* | 5/2018 | Tran .................... | A63B 71/145 |
| 2018/0123882 A1* | 5/2018 | Anderson ........... | H04L 41/0813 |
| 2018/0167198 A1* | 6/2018 | Muller .................... | G06F 21/16 |
| 2018/0232413 A1* | 8/2018 | Eshwar ............. | G06F 17/30377 |
| 2018/0285810 A1* | 10/2018 | Ramachandran .... | G06Q 10/087 |
| 2019/0013943 A1* | 1/2019 | Maim ........................ | H04L 9/14 |
| 2019/0051390 A1* | 2/2019 | Shah ...................... | G16H 10/60 |
| 2019/0057382 A1* | 2/2019 | Wright ............... | G06Q 20/3827 |
| 2019/0213518 A1* | 7/2019 | Lee .................. | G06Q 10/06316 |
| 2019/0286490 A1 | 9/2019 | Wang | |

FOREIGN PATENT DOCUMENTS

| | | |
|---|---|---|
| CN | 108805562 A | 11/2018 |
| CN | 108985937 A | 12/2018 |
| KR | 101643251 | 7/2016 |
| WO | WO2018219283 A1 | 12/2018 |

OTHER PUBLICATIONS

European Extended Search Report in European Patent Application No. 18867247.1, dated Oct. 14, 2019, 8 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/120795, dated Apr. 26, 2019, 6 pages.

* cited by examiner

EVENT-DRIVEN BLOCKCHAIN WORKFLOW PROCESSING

CROSS-REFERENCE TO RELATED APPLICATIONS

This application is a continuation of U.S. application Ser. No. 16/421,260, filed on May 23, 2019, which is a continuation of PCT Application No. PCT/CN2018/120795, filed on Dec. 13, 2018, each of which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

In private blockchain networks, multi-party cooperation can be challenging and resource intensive. In a conventional blockchain environment, a large number of nodes may be performing the same tasks. For example, when executing a script stored in the blockchain (e.g., a smart contract), each node participating in the blockchain network may be executing the same instruction from the script in parallel. Such a configuration is good for achieving consensus on the results of the instruction, but may be inefficient in terms of the resources expended to arrive at this consensus.

SUMMARY

Implementations of the present specification include computer-implemented methods for event-driven blockchain workflow processing. More particularly, implementations of the present specification are directed to an event-driven process in which a workflow node manages the processing of tasks originating from the blockchain by specifically assigning the tasks to multiple other nodes in the blockchain network.

In some implementations, actions include receiving, at a workflow processing node in the blockchain network from a client, a request to execute a workflow program, wherein the workflow program is stored in a blockchain maintained by the blockchain network; identifying, by the workflow processing node, an operation associated with the workflow program; assigning, by the workflow processing node, the identified operation to a subset of the plurality of nodes in the blockchain network, wherein each node in the subset of nodes is configured to execute the operation separately from the other nodes in the subset of nodes; identifying, by the workflow processing node, processing results for the executed operation associated with nodes in the subset of nodes, each processing result associated with a particular node in the subset of nodes and representing a result of the executed operation produced by the particular node; and determining, by the workflow processing node, a consensus result for the operation based on the identified processing results associated with a number of nodes greater than or equal to a consensus threshold matching the consensus result.

Other implementations include corresponding systems, apparatus, and computer programs, configured to perform the actions of the methods, encoded on computer storage devices.

These and other implementations may each optionally include one or more of the following features:

In some cases, the method can include storing the consensus result for the operation in the blockchain.

In some implementations, the operation is a first operation, and the method further comprises: identifying, by the workflow processing node, a final operation associated with the workflow program, wherein the final operation is separate from the first operation and appears last in an ordered set of instructions associated with the workflow program; assigning, by the workflow processing node, the final operation to the subset of nodes; identifying, by the workflow processing node, processing results for the final operation associated with nodes in the subset of nodes; determining a consensus result for the final operation based on the identified processing results; and sending, by the workflow processing node, a response to the client indicating that the workflow program has completed execution successfully.

In some cases, the operation is a first operation, and the method further comprises:

identifying, by the workflow processing node, a second operation associated with the workflow program, wherein the second operation is separate from the first operation; assigning, by the workflow processing node, the second operation to the subset of nodes; identifying, by the workflow processing node, processing results for the second operation associated with nodes in the subset of nodes; and determining that no consensus result exists for the second operation based on a number of nodes less than the consensus threshold being associated a same processing result.

In some implementations, the method can include sending, by the workflow processing node, a response to the client indicating that execution of the workflow program was not successful.

In some cases, each identified processing result is digitally signed by the associated node.

In some aspects, the workflow program includes executable byte code configured to be executed by the plurality of nodes.

In some cases, wherein assigning the identified operation to the subset of nodes includes executing, by the workflow processing node, a remote procedure call associated with the operation on each of the subset of nodes.

In some implementations, the blockchain is an Ethereum blockchain and the workflow program is a smart contract program.

In some aspects, each of the nodes in the blockchain network is associated one of a plurality of entities participating in the blockchain network.

In some implementations, the subset of nodes includes at least one node associated with each of the plurality of entities participating in the blockchain network.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

Like reference symbols in the various drawings indicate like elements.

DETAILED DESCRIPTION

Implementations of the present specification include computer-implemented methods for event-driven blockchain workflow processing. More particularly, implementations of the present specification are directed to event-driven blockchain workflow processing. In some implementations, actions include receiving, at a workflow processing node in the blockchain network from a client, a request to execute a workflow program, wherein the workflow program is stored in a blockchain maintained by the blockchain network; identifying, by the workflow processing node, an operation associated with the workflow program; assigning, by the workflow processing node, the identified operation to a subset of the plurality of nodes in the blockchain network, wherein each node in the subset of nodes is configured to execute the operation separately from the other nodes in the subset of nodes; identifying, by the workflow processing node, processing results for the executed operation associated with nodes in the subset of nodes, each processing result associated with a particular node in the subset of nodes and representing a result of the executed operation produced by the particular node; and determining a consensus result for the operation based on the identified processing results associated a number of nodes greater than or equal to a consensus threshold matching the consensus result.

To provide further context for implementations of the present specification, and as introduced above, distributed ledger systems (DLSs), which can also be referred to as consensus systems (e.g., made up of peer-to-peer nodes), and blockchain networks, enable participating entities to securely, and immutably conduct transactions, and store data. Although the term blockchain is generally associated with the various cryptocurrency networks, blockchain is used herein to generally refer to a DLS without reference to any particular use case.

A blockchain is a data structure that stores transactions in a way that allows future transactions to be verified for consistency with all prior transaction activity. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining if it is consistent with the structure of the tree.

Whereas a blockchain is a data structure for storing transactions, a blockchain network is a network of computing nodes that manage, update, and maintain a particular blockchain. As introduced above, a blockchain network can be provided as a public blockchain network, a private blockchain network, or a consortium blockchain network. In a public blockchain network, the consensus process is controlled by nodes of the consensus network. For example, hundreds, thousands, even millions of entities can cooperate in a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Examples of public blockchain networks include various cryptocurrency networks, which are peer-to-peer payment networks. The cryptocurrency networks leverage a distributed ledger, referred to as blockchain. As noted above, the term blockchain, however, is used to generally refer to distributed ledgers without particular reference to any particular cryptocurrency network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in cryptocurrency networks.

In general, a private blockchain network is provided for a particular entity, which centrally controls read and write permissions. The entity controls, which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present specification are described in further detail herein with reference to a private blockchain network, in which restrictions are placed on who is allowed to participate in the network. It is contemplated, however, that implementations of the present specification can be realized in any appropriate type of blockchain network.

Implementations of the present specification are described in further detail herein in view of the above context. More particularly, and as introduced above, implementations of the present specification are directed to an event-driven process in which a workflow node manages the processing of tasks originating from the blockchain by specifically assigning the tasks to multiple other nodes in the blockchain network.

The techniques described herein represent a technical solution to the technical problem of poor performance for distributed processing of tasks in a blockchain network, while maintaining the consensus mechanisms that are one of the key benefits of blockchain technology. For example, the present techniques involve specifically managing which nodes in the blockchain network execute particular operations, as opposed to every node racing to complete each operation in conventional implementations. The techniques also maintain the consensus mechanisms by sending the same operation to multiple nodes and configuring a threshold for the number of nodes that must agree on a result for consensus. In addition, the event-driven nature of the present techniques (e.g., the workflow processing node sending specific messages to nodes to assign operations) further improves performance, as the nodes can simply wait for an event from the workflow processing node to begin processing rather than regularly polling the block chain for updates.

Figure 1:
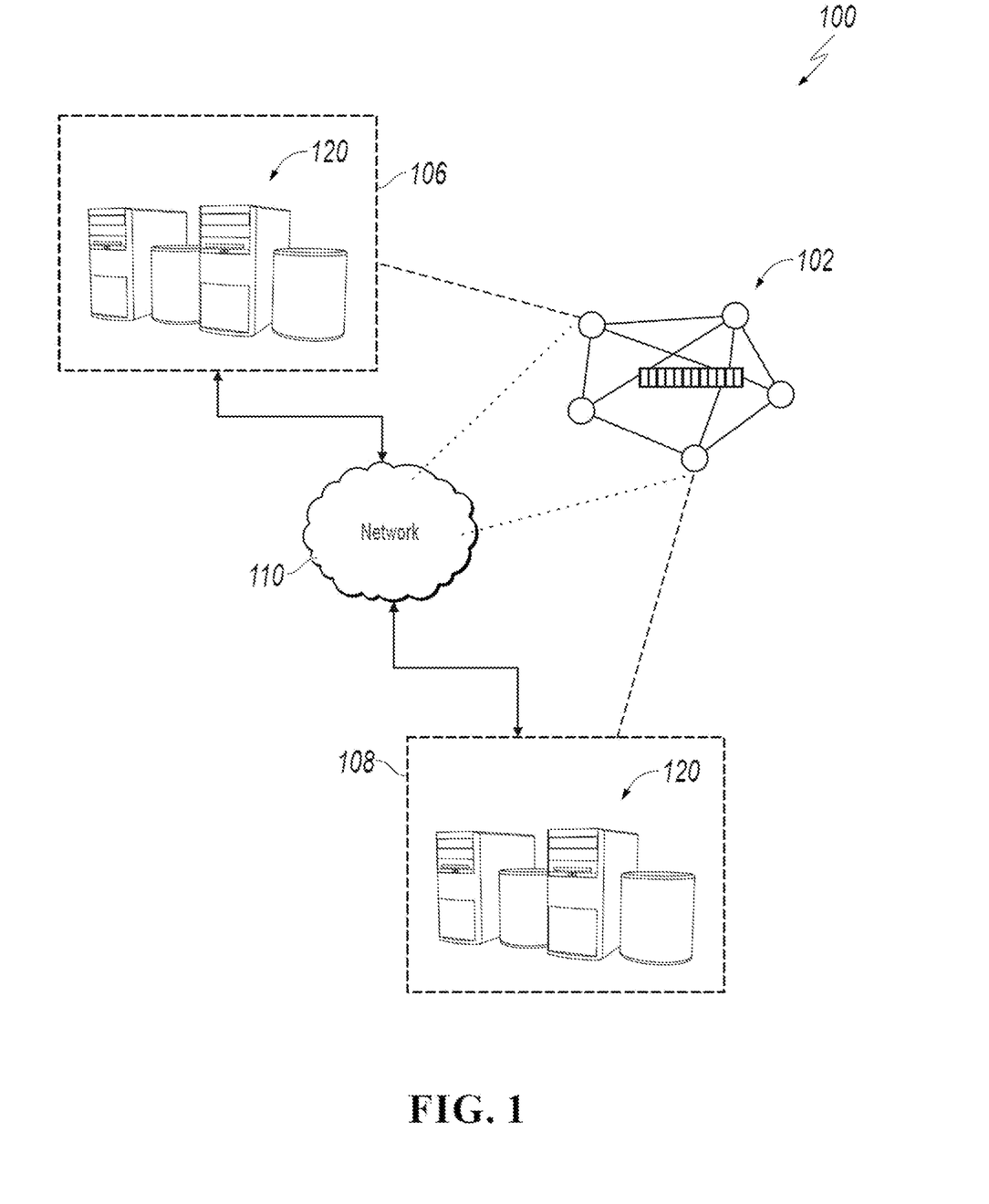
FIG. 1 depicts an example environment that can be used to execute implementations of the present specification.

FIG. 1 depicts an example environment 100 that can be used to execute implementations of the present specification. In some examples, the example environment 100 enables entities to participate in a private blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the private blockchain network 102. In general the network 110 represents one or more communication networks.

In the depicted example, the computing systems 106, 108 can each include any appropriate computing system that enables participation as a node in the private blockchain network 102. Example computing devices include, without limitation, a server, a desktop computer, a laptop computer, a tablet computing device, and a smartphone. In some examples, the computing systems 106, 108 hosts one or more computer-implemented services for interacting with the private blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the private blockchain network 102 is represented as a peer-to-peer network of nodes, and the computing systems 106, 108 provide nodes of the first entity, and second entity respectively, which participate in the private blockchain network 102.

Figure 2:
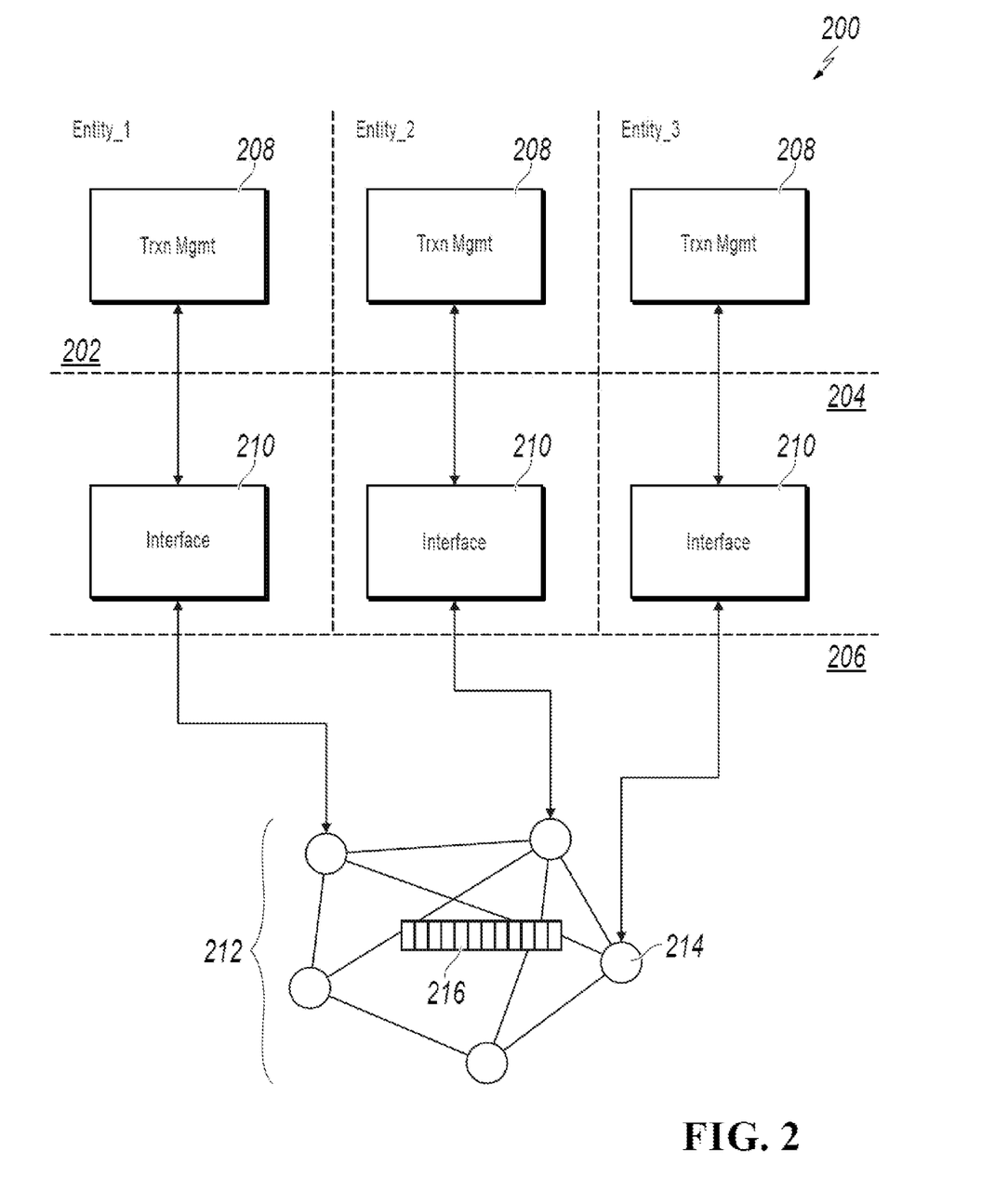
FIG. 2 depicts an example conceptual architecture in accordance with implementations of the present specification.

FIG. 2 depicts an example architecture 200 in accordance with implementations of the present specification. The example conceptual architecture 200 includes an entity layer 202, a hosted services layer 204, and a blockchain network layer 206. In the depicted example, the entity layer 202 includes three entities, Entity _1 (E1), Entity_2 (E2), and Entity _3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the private blockchain network.

Figure 3:
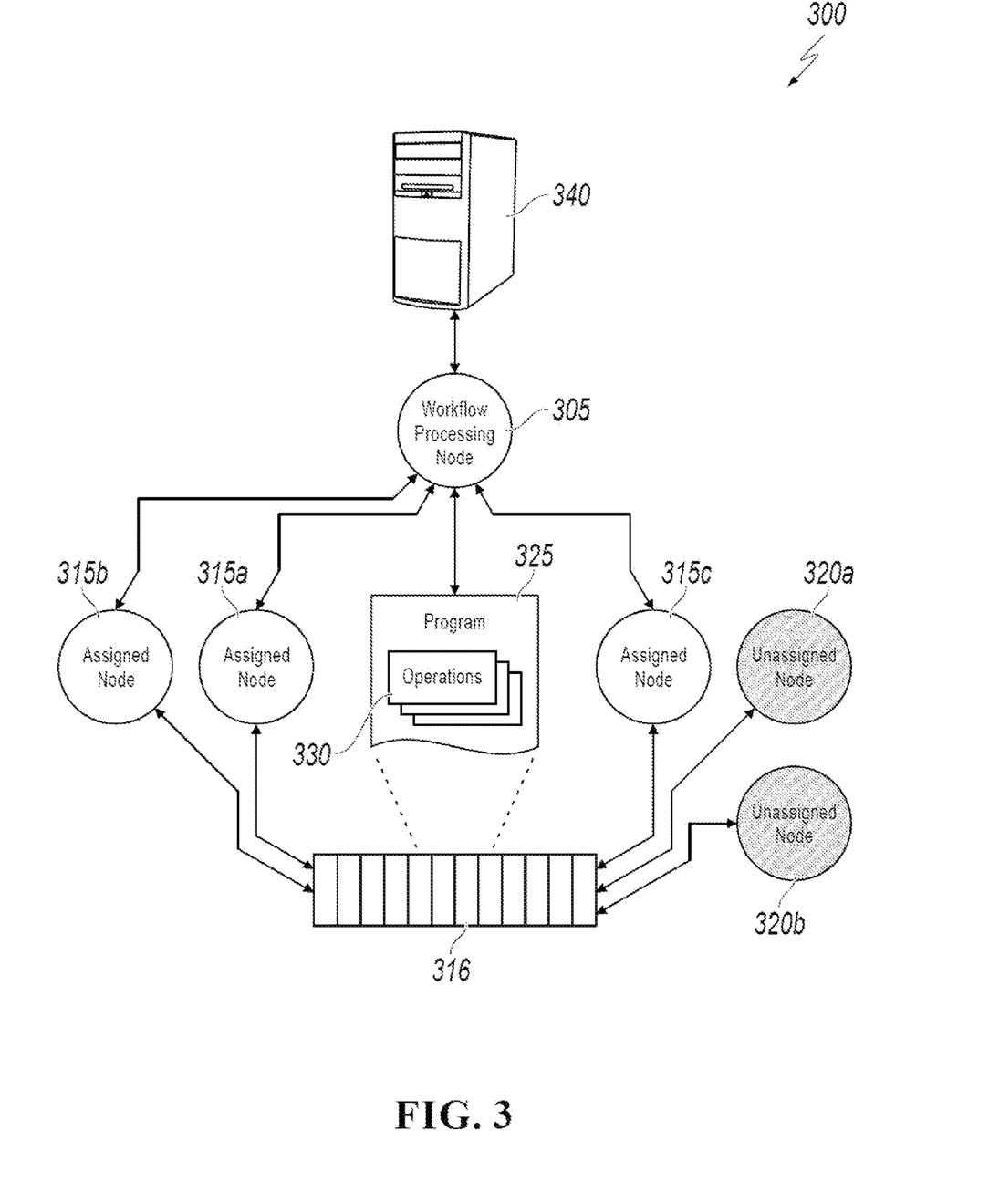
FIG. 3 depicts an example system for event-driven blockchain workflow processing in accordance with implementations of the present specification.

FIG. 3 depicts an example system for event-driven blockchain workflow processing in accordance with implementations of the present specification. As shown, the system includes a workflow processing node 305 in communication with other nodes 315a-c and 320a,b participating in the blockchain network. The blockchain network includes a blockchain 316. A program 325 is stored in the blockchain 316, and includes a number of operations or instructions 330. A client 340 is in communication with the workflow processing node 305.

In operation, the claim 340 sends a request to workflow processing node 305 requesting execution of workflow program 305 stored in the blockchain 316. The workflow processing node 305 reads the program 325 from the blockchain 316, and identifies an operation 330 to be executed as part of the program 325. The workflow processing node 305 then selects a plurality of nodes in the blockchain network to perform the identified operation 330. In the example depicted in FIG. 3, the workflow processing node 305 has selected assigned nodes 315a-c, while unassigned nodes 320a-b will not process the instruction. Once the workflow processing node 305 has selected the nodes 315a-c to perform the operation, each of the assigned nodes 315a-c executes the operation, and returns a result of the operation to the workflow processing node 305. Because each of the nodes 315a-c is independently executing the operation 330, each of the nodes 315a-c provides a result of the operation to workflow processing node 305. Workflow processing node 305 analyzes the received results to determine whether a consensus result for the operation 330 has been reached by the nodes 315a-c. This process is described in greater detail with respect to FIGS. 4 and 5.

Figure 4:
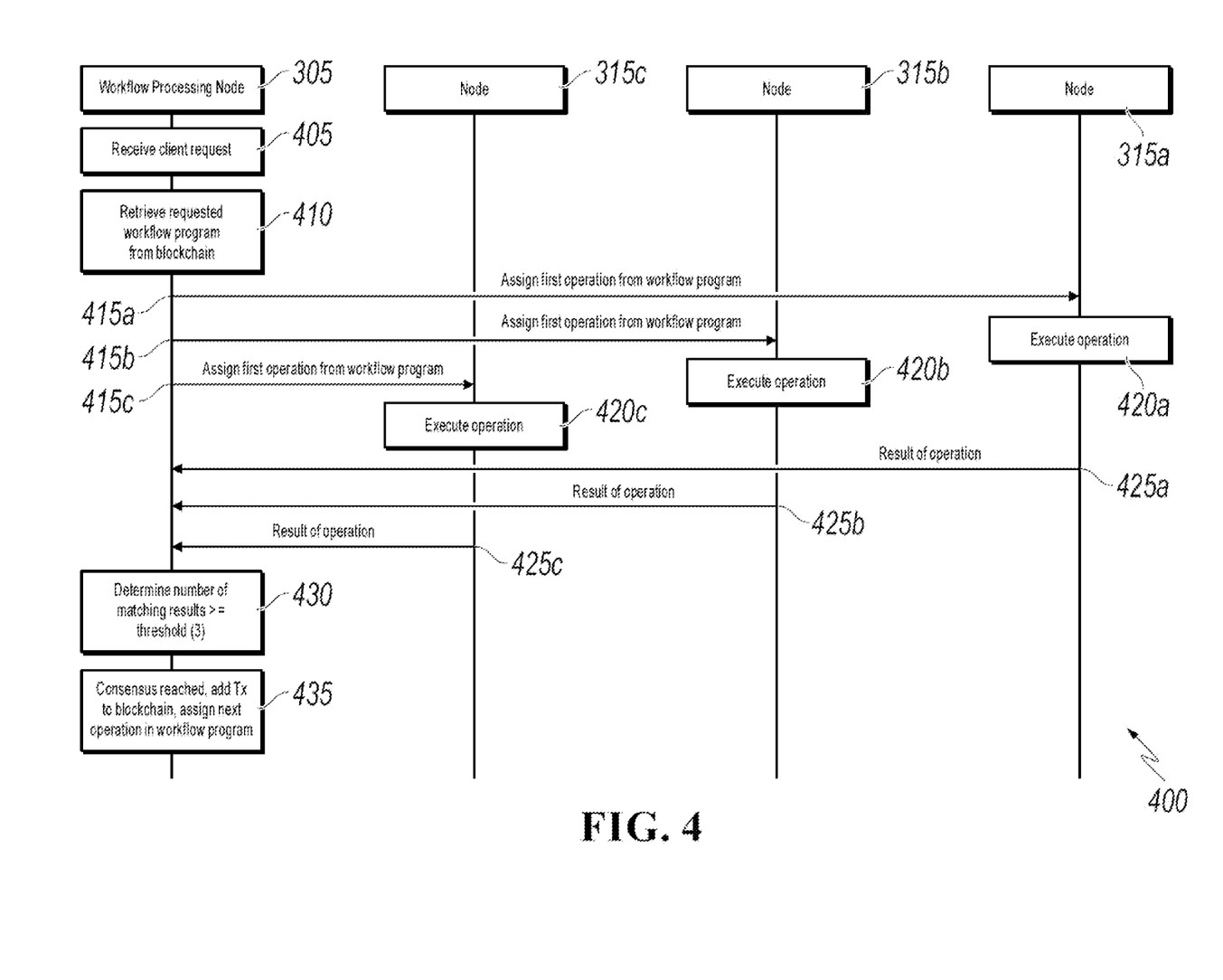
FIG. 4 depicts an example process for executing a workflow program in accordance with implementations of the present specification.

FIG. 4 depicts an example process 400 for executing a workflow program (e.g., the program 325 in FIG. 3) in accordance with implementations of the present specification. As shown, the process involves interactions between workflow processing node 305, and nodes 315a-c from FIG. 3.

At 405, the workflow processing node 305 receives a client request. In some implementations, the request may be received by the workflow processing node 305 over a network, such as a private Internet Protocol (IP) network, a public IP network such as the Internet, or other network. The request may be formatted according to a network communications protocol, such as Hypertext Transfer Protocol (HTTP), Remote Procedure Call (RPC), or other protocols. The request may include an identification of a workflow program for execution by the nodes of the blockchain network. In some implementations, the request may include a location within the blockchain where the workflow program is stored.

At 410, the workflow processing node retrieves the request workflow program from the blockchain. In some cases, the workflow program is a smart contract program stored in the blockchain. The workflow program can also be a set of bytecode (e.g., Java bytecode) stored in the blockchain. The workflow program can also be a set of instructions in any programming language configured to be executed by the nodes 315a-c under the direction of workflow processing node 305.

At 415a-c, the workflow processing node assigns a first operation from the retrieved workflow program to nodes 315a-c. At 420a-c, the nodes 315a-c independently execute the assigned first operation. At 425a-c, the nodes 315a-c each send a result obtained from the execution of the first operation. For example, the result may be a representation of the updated execution state of the workflow program after executing the operation, including, for example, updated values for a memory space associated with the workflow program, an updated program counter, or other information regarding the state of the workflow program after completion of the operation.

At 430, the workflow processing node 305 analyzes the results from the nodes 315a-c to determine whether a consensus result has been reached. For example, the workflow processing node 305 may be configured with a consensus threshold specifying a number of nodes that must return a same result in order to achieve a consensus result. As shown, if the number of matching results is greater than or equal to this threshold, the workflow processing node 305 determines that consensus has been reached. In the example process 400, the threshold is 3, and the results from all 3 nodes 315a-c are the same, indicating that consensus has been reached.

At 435, the workflow processing node 305 determines that consensus has been reached based on the analysis described above. The workflow processing node 305 adds the result of the first operation to the blockchain, and repeats the process 400 starting at 415a with a next operation of the workflow program.

Figure 5:
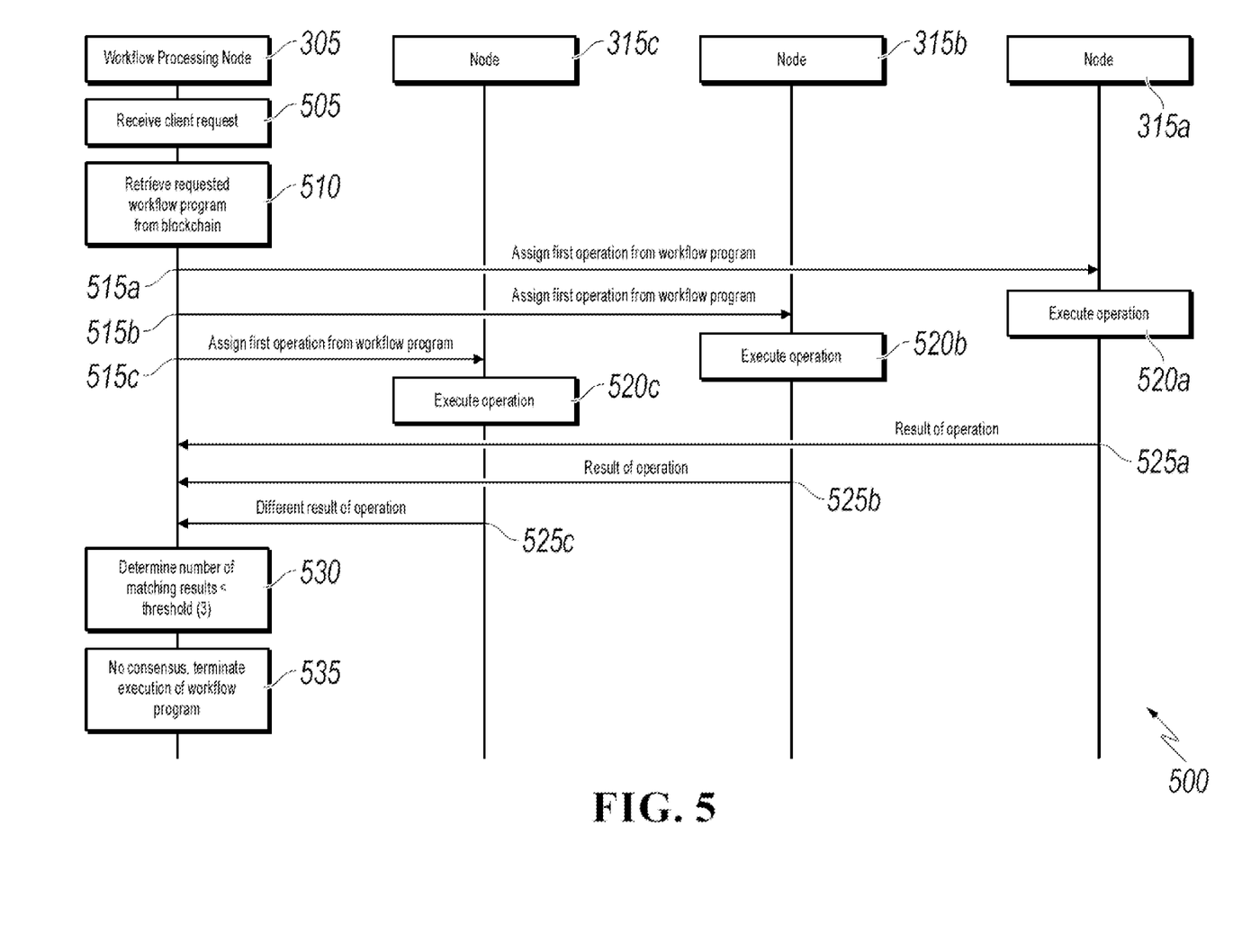
FIG. 5 depicts an example process for executing a workflow program in accordance with implementations of the present specification.

FIG. 5 depicts an example process 500 for executing a workflow program in accordance with implementations of the present specification. Process 500 provides an example of how the workflow processing node 305 handles receiving different results for the operation from the assigned nodes 315a-c.

At 505, the workflow processing node 305 receives a client request. In some implementations, the request may be received by the workflow processing node 305 over a network, such as a private IP network, a public IP network such as the Internet, or other network. The request may be formatted according to a network communications protocol, such as HTTP, RPC, or other protocols. The request may include an identification of a workflow program for execution by the nodes of the blockchain network. In some implementations, the request may include a location within the blockchain where the workflow program is stored.

At 510, the workflow processing node retrieves the request workflow program from the blockchain. In some cases, the workflow program is a smart contract program stored in the blockchain. The workflow program can also be a set of bytecode (e.g., Java bytecode) stored in the blockchain. The workflow program can also be a set of instructions in any programming language configured to be executed by the nodes 315a-c under the direction of workflow processing node 305.

At 515a-c, the workflow processing node assigns a first operation from the retrieved workflow program to nodes 315a-c. At 520a-c, the nodes 315a-c independently execute the assigned first operation. At 525a-c, the nodes 315a-c each send a result obtained from the execution of the first operation. For example, the result may be a representation of the updated execution state of the workflow program after executing the operation, including, for example, updated values for a memory space associated with the workflow program, an updated program counter, or other information regarding the state of the workflow program after completion of the operation.

At 530, the workflow processing node 305 analyzes the results from the nodes 315a-c to determine whether a consensus result has been reached. As shown, the result from node 315c differs from the results from nodes 315a, b. Thus, only two of the three nodes returned the same result. Given the consensus threshold of 3 discussed above, the number of nodes returning the same result (2) is less than the threshold, indicating that no consensus has been reached with respect to the result of the operation.

At 535, based on the determination that no consensus has been reached, the workflow processing node 305 terminates execution of the workflow program. In some implementations, the workflow processing node 305 may send an indication to the client 340 that its requested workflow program has terminated due to lack of consensus. In some cases, the workflow processing node 305 may "rollback" any prior operations from the program by removing the transactions from the blockchain or submitting additional transactions to undo the effects of the previous operations (e.g., crediting any accounts to return funds debited by operations of the terminated program).

In some implementations, the determination of no consensus is made if after a predetermined time the number of nodes in agreement on a result is less than the threshold value.

Figure 6:
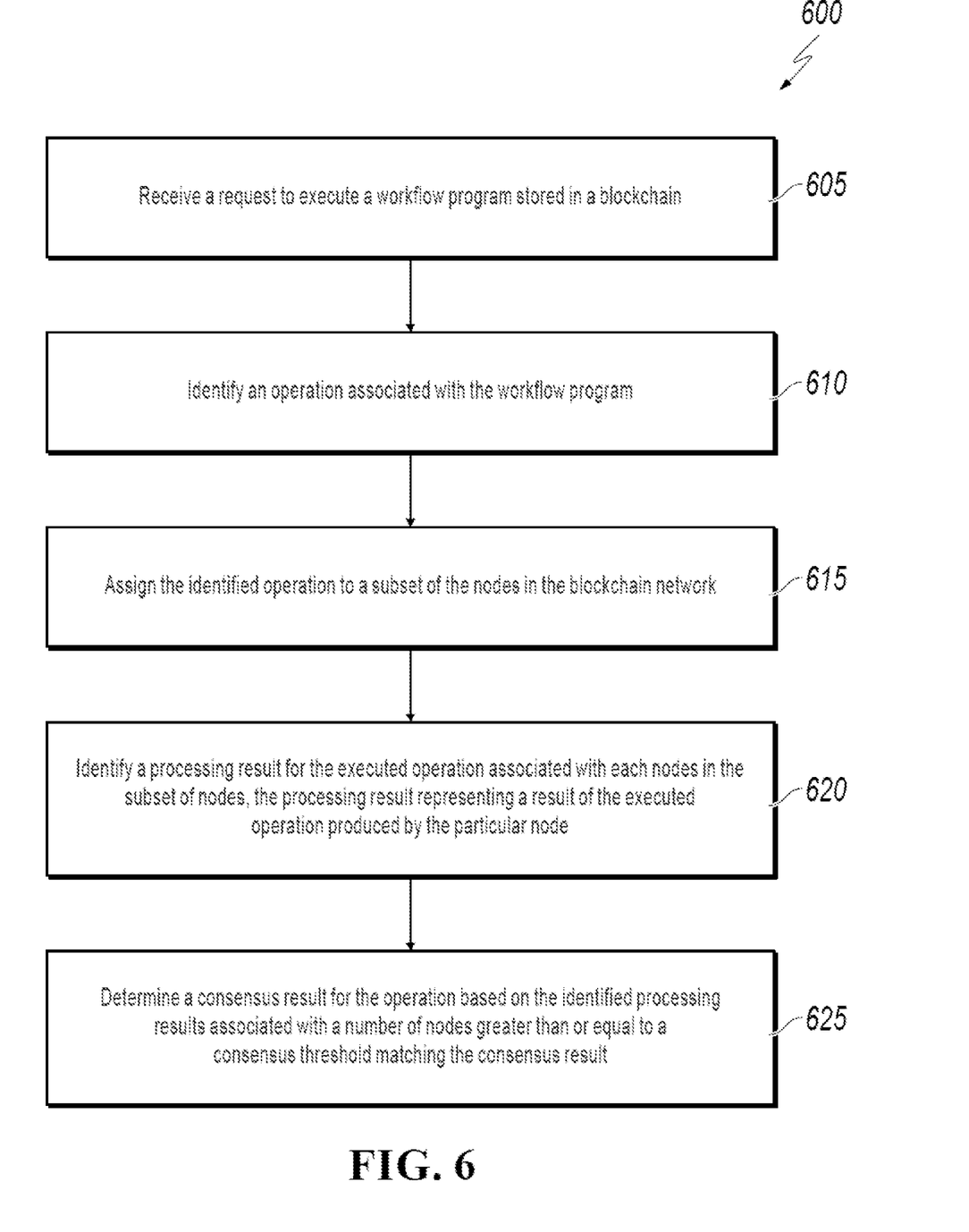
FIG. 6 depicts an example process that can be executed in accordance with implementations of the present specification.

FIG. 6 depicts an example process 600 that can be executed in accordance with implementations of the present specification. In some implementations, the example process 600 may be performed using one or more computer-executable programs executed using one or more computing devices.

At 605, a workflow processing node in a blockchain network receives, from a client, a request to execute a workflow program, wherein the workflow program is stored in a blockchain maintained by the blockchain network. In some cases, the blockchain is an Ethereum blockchain and the workflow program is a smart contract program.

At 610, the workflow processing node identifies an operation associated with the workflow program. In some cases, the workflow program includes executable byte code configured to be executed by the plurality of nodes.

At 615, the workflow processing node assigns the identified operation to a subset of the plurality of nodes in the blockchain network, wherein each node in the subset of nodes is configured to execute the operation separately from the other nodes in the subset of nodes. In some cases, assigning the identified operation to the subset of nodes includes executing, by the workflow processing node, a remote procedure call associated with the operation on each of the subset of nodes. In some cases, each of the nodes in the blockchain network is associated one of a plurality of entities participating in the blockchain network, and the subset of nodes includes at least one node associated with each of the plurality of entities participating in the blockchain network At 620, the workflow processing node identifies processing results for the executed operation associated with nodes in the subset of nodes, each processing result associated with a particular node in the subset of nodes and representing a result of the executed operation produced by the particular node. In some cases, each identified processing result is digitally signed by the associated node.

At 625, the workflow processing node determines a consensus result for the operation based on the identified processing results associated with a number of nodes greater than or equal to a consensus threshold matching the consensus result. In some implementations, the workflow processing node stores the consensus result for the operation in the blockchain.

In some cases, the operation is a first operation, and the process 600 includes identifying, by the workflow processing node, a final operation associated with the workflow program, wherein the final operation is separate from the first operation and appears last in an ordered set of instructions associated with the workflow program; assigning, by the workflow processing node, the final operation to the subset of nodes; identifying, by the workflow processing node, processing results for the final operation associated with nodes in the subset of nodes; determining a consensus result for the final operation based on the identified processing results; and sending, by the workflow processing node, a response to the client indicating that the workflow program has completed execution successfully.

In implementations, the operation is a first operation, the process 600 includes identifying, by the workflow processing node, a second operation associated with the workflow program, wherein the second operation is separate from the first operation; assigning, by the workflow processing node, the second operation to the subset of nodes; identifying, by the workflow processing node, processing results for the second operation associated with nodes in the subset of nodes; and determining that no consensus result exists for the second operation based on a number of nodes less than the consensus threshold being associated a same processing result. In some cases, the workflow processing node sends a response to the client indicating that execution of the workflow program was not successful.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for workflow processing in a blockchain network, the method comprising:
    receiving, from a client, at a workflow processing node in the blockchain network, a request to execute a workflow program that is stored in a blockchain maintained by the blockchain network;

identifying, by the workflow processing node, an initial operation associated with the workflow program;

assigning, by the workflow processing node, the initial operation to a subset of a plurality of nodes in the blockchain network;

identifying, by the workflow processing node, processing results associated with executing the initial operation associated with nodes in the subset of nodes; and determining, by the workflow processing node, a consensus result for the initial operation based on the identified processing results associated with a relationship between a number of nodes and a consensus threshold matching the consensus result.

2. The computer-implemented method of claim 1, further comprising:

storing the consensus result for the operation in the blockchain.

3. The computer-implemented method of claim 1, further comprising:

identifying, by the workflow processing node, a final operation associated with the workflow program, wherein the final operation is separate from the initial operation and appears last in an ordered set of instructions associated with the workflow program;

assigning, by the workflow processing node, the final operation to the subset of nodes;

identifying, by the workflow processing node, processing results for the final operation associated with nodes in the subset of nodes;

determining a consensus result for the final operation based on the identified processing results; and sending, by the workflow processing node, a response to the client indicating that the workflow program has completed execution successfully.

4. The computer-implemented method of claim 1, further comprising:

identifying, by the workflow processing node, an intermediate operation associated with the workflow program, wherein the intermediate operation is separate from the first operation;

assigning, by the workflow processing node, the intermediate operation to the subset of nodes;

identifying, by the workflow processing node, processing results for the intermediate operation associated with nodes in the subset of nodes; and determining that no consensus result exists for the intermediate operation based on a number of nodes less than the consensus threshold being associated a same processing result.

5. The computer-implemented method of claim 4, further comprising:

sending, by the workflow processing node, a response to the client indicating that execution of the workflow program was not successful.

6. The computer-implemented method of claim 1, wherein assigning the identified initial operation to the subset of nodes includes:

executing, by the workflow processing node, a remote procedure call associated with the operation on each of the subset of nodes.

7. The computer-implemented method of claim 1, wherein each of the nodes in the blockchain network is associated one of a plurality of entities participating in the blockchain network.

8. A non-transitory computer-readable storage medium storing one or more instructions executable by a computer system to perform processing comprising:

receiving, from a client, at a workflow processing node in the blockchain network, a request to execute a workflow program that is stored in a blockchain maintained by the blockchain network;

identifying, by the workflow processing node, an initial operation associated with the workflow program;

assigning, by the workflow processing node, the initial operation to a subset of a plurality of nodes in the blockchain network;

identifying, by the workflow processing node, processing results associated with executing the initial operation associated with nodes in the subset of nodes; and determining, by the workflow processing node, a consensus result for the initial operation based on the identified processing results associated with a relationship between a number of nodes and a consensus threshold matching the consensus result.

9. The non-transitory computer-readable storage medium of claim 8, wherein the processing further comprises:

storing the consensus result for the operation in the blockchain.

10. The non-transitory computer-readable storage medium of claim 8, wherein the processing further comprises:

identifying, by the workflow processing node, a final operation associated with the workflow program, wherein the final operation is separate from the initial operation and appears last in an ordered set of instructions associated with the workflow program;

assigning, by the workflow processing node, the final operation to the subset of nodes;

identifying, by the workflow processing node, processing results for the final operation associated with nodes in the subset of nodes;

determining a consensus result for the final operation based on the identified processing results; and sending, by the workflow processing node, a response to the client indicating that the workflow program has completed execution successfully.

11. The non-transitory computer-readable storage medium of claim 8, wherein the processing further comprises:

identifying, by the workflow processing node, an intermediate operation associated with the workflow program, wherein the intermediate operation is separate from the first operation;

assigning, by the workflow processing node, the intermediate operation to the subset of nodes;

identifying, by the workflow processing node, processing results for the intermediate operation associated with nodes in the subset of nodes; and determining that no consensus result exists for the intermediate operation based on a number of nodes less than the consensus threshold being associated a same processing result.

12. The non-transitory computer-readable storage medium of claim 11, wherein the processing further comprises:

sending, by the workflow processing node, a response to the client indicating that execution of the workflow program was not successful.

13. The non-transitory computer-readable storage medium of claim 8, wherein assigning the identified operation to the subset of nodes includes:

executing, by the workflow processing node, a remote procedure call associated with the operation on each of the subset of nodes.

14. The non-transitory computer-readable storage medium of claim 8, wherein each of the nodes in the blockchain network is associated one of a plurality of entities participating in the blockchain network.

15. A system, comprising:
one or more computers; and
one or more computer memory devices interoperably coupled with the one or more computers and having tangible, non-transitory, machine-readable media storing one or more instructions that, when executed by the one or more computers, perform processing comprising:
receiving, from a client, at a workflow processing node in the blockchain network, a request to execute a workflow program that is stored in a blockchain maintained by the blockchain network;
identifying, by the workflow processing node, an initial operation associated with the workflow program;
assigning, by the workflow processing node, the initial operation to a subset of a plurality of nodes in the blockchain network;
identifying, by the workflow processing node, processing results associated with executing the initial operation associated with nodes in the subset of nodes; and
determining, by the workflow processing node, a consensus result for the initial operation based on the identified processing results associated with a relationship between a number of nodes and a consensus threshold matching the consensus result.

16. The system of claim 15, the processing further comprising:
storing the consensus result for the operation in the blockchain.

17. The system of claim 15, wherein the processing further comprises:
identifying, by the workflow processing node, a final operation associated with the workflow program, wherein the final operation is separate from the initial operation and appears last in an ordered set of instructions associated with the workflow program;
assigning, by the workflow processing node, the final operation to the subset of nodes;
identifying, by the workflow processing node, processing results for the final operation associated with nodes in the subset of nodes;
determining a consensus result for the final operation based on the identified processing results; and
sending, by the workflow processing node, a response to the client indicating that the workflow program has completed execution successfully.

18. The system of claim 15, wherein the processing further comprises:
identifying, by the workflow processing node, an intermediate operation associated with the workflow program, wherein the intermediate operation is separate from the first operation;
assigning, by the workflow processing node, the intermediate operation to the subset of nodes;
identifying, by the workflow processing node, processing results for the intermediate operation associated with nodes in the subset of nodes; and
determining that no consensus result exists for the intermediate operation based on a number of nodes less than the consensus threshold being associated a same processing result.

19. The system of claim 18, wherein the processing further comprises:
sending, by the workflow processing node, a response to the client indicating that execution of the workflow program was not successful.

20. The system of claim 15, wherein assigning the identified operation to the subset of nodes includes:
executing, by the workflow processing node, a remote procedure call associated with the operation on each of the subset of nodes.

* * * * *